United States Patent [19]

Tuttle

[11] 3,781,667
[45] Dec. 25, 1973

[54] HIGH VOLTAGE RESONANT TESTING CIRCUIT

[75] Inventor: Charles H. Tuttle, Medford, Mass.

[73] Assignee: General Electric Company, Schenectady, N.Y.

[22] Filed: Mar. 17, 1972

[21] Appl. No.: 235,709

[52] U.S. Cl. .................................. 324/57 R, 324/54
[51] Int. Cl. ............................................. G01r 27/00
[58] Field of Search .................. 324/57 R, 57 Q, 54

[56] References Cited
UNITED STATES PATENTS

| | | | |
|---|---|---|---|
| 2,273,066 | 2/1942 | Povey et al. | 324/57 R |
| 3,515,986 | 6/1970 | Peschel | 324/54 |

FOREIGN PATENTS OR APPLICATIONS

| | | | |
|---|---|---|---|
| 646,756 | 11/1950 | Great Britain | 324/54 |

Primary Examiner—Stanley T. Krawczewicz
Attorney—Vale P. Myles, Frank L. Neuhauser and Oscar B. Waddell

[57] ABSTRACT

A transformer has two secondary windings, a high voltage secondary connected across a capacitive load being tested, and a low voltage secondary connected across a variable reactor which is tuned to resonance with the capacitive load. A voltage regulator in the transformer primary winding circuit is utilized to raise the voltage across the capacitive load to the test value after resonance has been achieved. The variable reactor can be replaced by a fixed reactor and a second voltage regulator.

10 Claims, 6 Drawing Figures

HIGH VOLTAGE RESONANT TESTING CIRCUIT

My invention relates to a circuit for high voltage testing of highly reactive loads, and in particular, to a circuit wherein a low voltage variable reactive means is tuned to resonance with the reactive load.

High voltage testing is utilized in applications such as testing the dielectric strength (electrical insulation) of high-voltage electrical transmission cable wherein a protective lead sheath enclosing the electrical conductors must be sufficiently electrically insulated therefrom for satisfactory operation of the cable under a variety of detrimental circumstances such as the cable environment or over-voltages caused by electrical transients such as lightning surges. This cable, and other high voltage electrical devices which may be tested for the dielectric strength of their insulating medium, exhibit very low resistance and very high reactance. In the past, the high voltage utilized in high-voltage testing was usually supplied by a high-voltage testing transformer designed for the purpose of stepping-up a nominal level, line voltage to the required high voltage, and was made adjustable by means of a voltage regulator in the supply line on the primary side of the transformer. This early, so-called "brute force" method of high voltage testing had the disadvantage of requiring a large size, high cost testing transformer since the reactive (KVA) power rating thereof had to be equal to the high reactive KVA rating of the load being tested. Also, the voltage regulator was costly since its KVA rating was half that of the transformer.

In order to reduce the KVA rating of the testing transformer and auxiliary equipment, especially the induction voltage regulator in the transformer primary circuit, various resonant circuits have been recently developed. The previously known resonant circuits have overcome some of the disadvantages of the prior brute force or nonresonant method of high voltage testing in that the high voltage transformer is reduced in both KVA and voltage rating. Thus, in a first approach, a variable reactor is connected in series circuit relationship and tuned for series resonance with the capacitive load in the case of testing the insulation level of a high-voltage transmission cable. However, this first approach requires that the variable reactor have the same high voltage rating as the voltage impressed across the cable undergoing test. High-voltage variable reactors are difficult and expensive to manufacture and present difficulties in obtaining precise variations in voltage at such high voltage levels. In a second approach, a second transformer is employed in the secondary circuit of the high voltage transformer and a fixed reactor, which is varied by a voltage regulator, is connected in the secondary circuit of the second transformer and tuned for resonance with the capacitive load connected in the secondary circuit of the first transformer. This latter approach has the disadvantage of requiring a second transformer which results in added expense and increased circuit complexity.

Therefore, one of the principal objects of my invention is to provide an improved circuit for high voltage, resonant testing applications.

Another object of my invention is to provide the circuit utilizing only one transformer.

A further object of my invention is to provide the circuit utilizing a low voltage rating means for resonating with a high voltage capacitive load being tested.

Briefly stated, and in accordance with my invention, I provide a circuit which includes a single high voltage transformer having a single primary and two secondary windings. The primary winding is connected through a low KVA rated induction voltage regulator to a source of alternating current power and a high voltage secondary winding is connected across the capacitive load to be tested. The second secondary winding is low voltage rated and is connected in circuit relationship with a variable inductive reactor means which may be a single variable reactor or be comprised of a fixed reactor and induction voltage regulator. A voltmeter is connected across a portion of the high voltage secondary winding for measuring the voltage impressed across the capacitive load. A voltage regulator in the primary circuit is initially adjusted to increase the voltage applied to the transformer primary winding to a low value. The variable reactor means is then adjusted for obtaining resonance with the capacitive load as indicated by a peak on the voltmeter. Finally, the voltage regulator is adjusted to obtain the required voltage across the capacitive load for testing thereof.

The features of my invention which I desire to protect herein are pointed out with particularity in the appended claims. The invention itself, however, both as to its organization and method of operation together with further objects and advantages thereof, may best be understood by reference to the following description taken in connection with the accompanying drawings wherein like parts in each of the several figures are identified by the same reference character, and wherein:

Figure 1:
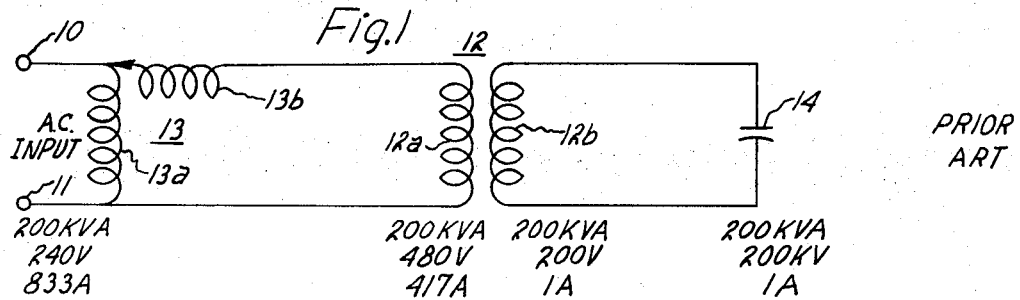
FIG. 1 is a schematic diagram of a prior art nonresonant high voltage testing circuit.

Referring now in particular to FIG. 1, there is shown a schematic diagram of an earlier prior art, high voltage nonresonant testing circuit which achieves testing of a particular load by the "brute force" method in that a high voltage testing transformer is utilized for the purpose of increasing (steeping-up) a nominal level, supply voltage to the high voltage required for the particular testing application. Thus, a pair of input terminals 10 and 11 are connected to an alternating current power source of relatively low voltage, commonly available in a location wherein the load is being tested, such as in a factory building. The A.C. source may have a frequency of 60 hertz in a typical application. A conventional high voltage transformer 12 has its primary winding 12a energized from the A.C. power supply terminals 10, 11 and the secondary winding 12b supplies the load being tested. For purposes of simplification, the magnetic core on which windings 12a and 12b are wound is not shown. Transformer 12 and all of the other electrical components described herein are of the relatively high power type as distinguished from electronic type components. Transformer 12 is of the step-up type in that the number of turns in the secondary winding 12b are substantially greater than the number of turns in the primary winding 12a. A conventional induction type voltage regulator 13 is connected in the primary winding circuit of transformer 12 for providing adjustment of the high voltage output across the secondary winding 12b of the transformer. Induction voltage regulator 13 consists of a winding 13a wound on a rotor and connected across the input supply line. A secondary winding 13b wound on a stator is connected in series with the supply line. The rotor can be rotated ± 180° and the relative position of the rotor and stator windings determines the magnetic coupling therebetween. The regulator can therefore add to or subtract from the line (input supply) voltage, a voltage having a maximum value equal to the line voltage. The load to be tested is connected across the secondary winding 12b of transformer 12 and for exemplary purposes will be assumed to be a length of high-voltage electrical transmission cable being tested for its dielectric strength, i.e., electrical insulation. A first end of transformer secondary winding 12b is suitably connected to the conductive sheath of the transmission cable and the second end is also suitably connected to the conductor (or one of the conductors) which is enclosed by a dielectric material and which in turn is enclosed by a protective lead or other electrically conductive sheath. The impedance presented by the transmission cable is essentially a capacitance existing across the dielectric between the cable conductor and outer sheath. In the case of a polyphase transmission cable (having multiple conductors), the high voltage testing would be performed between each conductor and the outer sheath as well as between each pair of conductors. Thus, for purposes of representing the transmission cable under test, a capacitor 14 is illustrated in FIG. 1 connected in circuit relationship across the secondary winding 12b of the high voltage testing transformer 12.

As a specific example, and to indicate the sizes of the various components utilized in the FIGS. 1–6 embodiments, it will be assumed that the cable test requirements are 200 kilovolts (KV), one ampere (A) at 60 hertz. Also, it will be assumed that the A.C. power source supplies 240 volts at 60 hertz across input terminals 10, 11 of the testing circuit. Finally, it will be assumed that the induction voltage regulator primary circuit of the high voltage transformer in each of the embodiments described herein has the capability of adjusting the output voltage thereof over a range of ±240 volts compared to the supply voltage, that is, the output voltage of regulator 13 is controllably adjustable from zero to 480 volts, and will be operated at 480 volts to obtain 200 KV across load 14.

The secondary winding 12b of high voltage test transformer 12 must have, as a minimum, at least the same reactive power and voltage ratings as capacitive load 14, that is, the reactive power rating must be at least 200 KVA, the voltage rating must be at least 200 KV, and the ampere rating at least 1A. Due to the transformer supplying substantially only reactive power, the primary winding 12a must also have the 200 KVA reactive power rating as the secondary winding and the power required at terminals 10, 11 is 200 KVA at 240 V and 833 A. The turns ratio of transformer 12 are selected such that 480 volts across the primary winding produces 200 KV across the secondary and thus the primary current rating is 417A. The KVA rating of regulator 13 is 417 × 240 = 100 KVA which conventionally requires an expensive oil-filled device. The high KVA rating of both the primary and secondary windings of transformer 12 results in such transformer being of large size and high cost.

Figure 2:
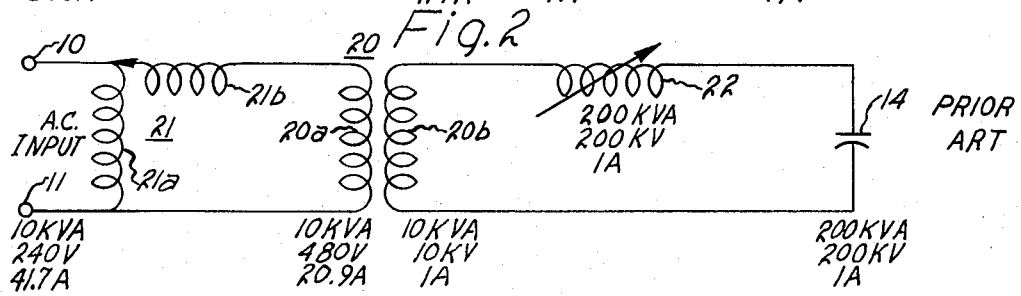
FIG. 2 is a schematic diagram of a first prior art resonant circuit for high voltage testing utilizing a high voltage variable reactor in the transformer secondary circuit.

In order to reduce the reactive power requirements of the high voltage transformer, and thereby reduce the size and cost thereof, various resonant circuits for high voltage testing applications have been utilized. In particular, FIG. 2 illustrates a first embodiment of a prior art resonant testing circuit which is described in greater detail in U.S. Pat. No. 3,515,986 to S.G. Peschel wherein a variable reactor 22 is connected in series circuit relationship with the capacitive load 14 in the secondary winding circuit of the high voltage testing transformer 20. A variable reactor conventionally consists of a winding or windings encircling a magnetic iron core. The core provides a path for flux produced by current flowing in the winding(s), and an air gap in the core flux path is used to control the amount of flux and thereby the inductance by varying the air gap length. Reactor 22 is adjusted to be in series resonance with capacitor 14 whereby the transformer supplies only the resistive losses in the circuit. In all of the resonant circuits to be described hereinafter, the $Q = (X_L/R)$ of the transformer secondary winding circuit is assumed to be 20, and thus the transformer secondary winding 20b in the FIG. 2 embodiment has a reactive power rating of 10 KVA, voltage rating of 10 KV and current rating of 1A in order to supply the same capacitive load 14 requirements (200 KVA, 200 KV, 1A) as described with reference to the FIG. 1 embodiment. Since the secondary winding 20b requirements are reduced, the primary winding 20a requirements are also likewise reduced to 10 KVA, 480 V and 20.9 A. The main advantage of the FIG. 2 embodiment is thus that the transformer 20 is of much smaller size since both the primary and secondary windings thereof have reduced KVA ratings, a reduced secondary winding voltage rating and reduced primary winding current rating, each reduced by the Q factor as compared to the FIG. 1 embodiment. Due to the much lower current requirements (417/20 = 20.9A) in the transformer primary winding 20a, the induction voltage regulator 21 in the primary winding circuit of transformer 20 is also of much smaller size (5 KVA), and can be of the air-type and therefore considerably less expensive than in the FIG. 1 embodiment. A disadvantage of the FIG. 2 embodiment is the large size of the variable reactor 22 since it must be rated at the same high reactive power and high voltage as the capacitive load, that is, the inductor 22 has a reactive power rating of 200 KVA and voltage rating of 200 KV. The reactor design with the herein described parameters has a high inductance of 530 henries. Further, the large size and the high voltage rating of reactor 22 presents difficulties in fabrication, expecially in the capability of being variable at such high voltage levels. The power source requirements from the supply lines are also reduced (by the Q factor) and for the parameters hereinabove described, the power required at terminals 10 and 11 is 10 KVA at 240 V and 41.7 A.

Figure 3:
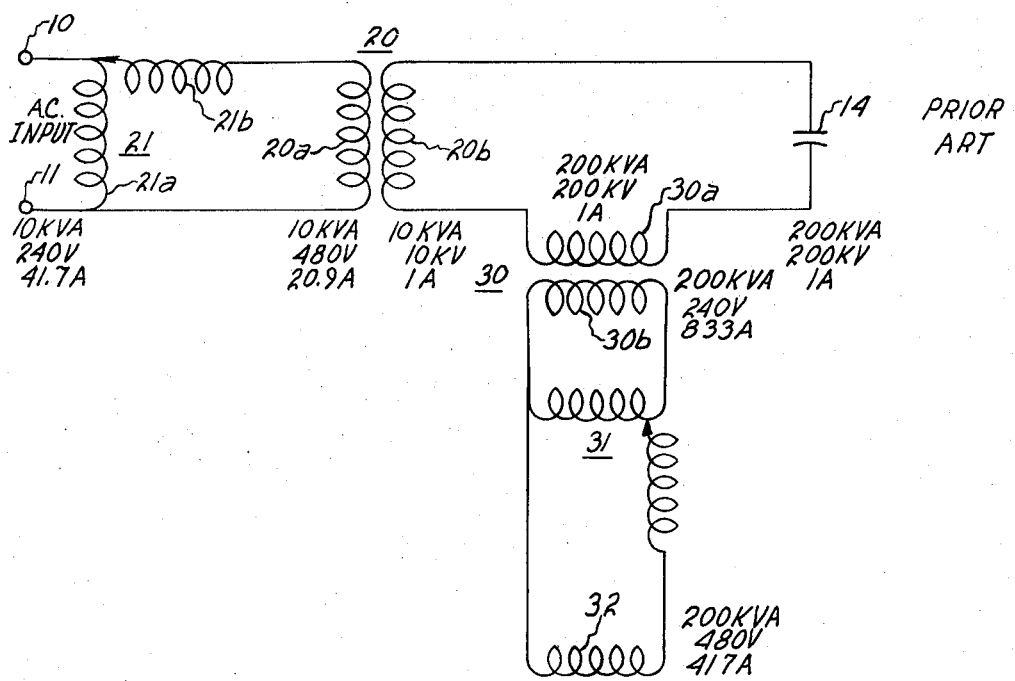
FIG. 3 is a schematic diagram of a second prior art resonant circuit for high voltage testing utilizing a second transformer which includes a variable reactor in the secondary circuit thereof.

A second prior art resonant circuit for high voltage testing application is illustrated in FIG. 3 wherein the primary and secondary windings of high voltage testing transformer 20 and the A.C. input power supplied at terminals 10 and 11 have the same ratings and requirements as in the FIG. 2 embodiment. The distinction between the FIGS. 3 and 2 embodiments is the use of a fixed reactor 32 in the FIG. 3 embodiment as compared to the variable reactor 22 in FIG. 2. The effective inductive reactance in the FIG. 3 transformer secondary circuit is varied by means of a second induction voltage regulator 31. Voltage regulator 31 is connected into the transformer 20 secondary circuit by means of a second transformer 30 wherein the transformer primary winding 30a is connected in series circuit relationship with the capacitive load 14 across high voltage testing transformer secondary winding 20b. Voltage regulator 31 and the fixed reactor 32 are connected in circuit relationship with the secondary winding 30b of transformer 30. For the particular circuit parameters described hereinabove, the input power supply to terminals 10 and 11, the induction voltage regulator 21 and the high voltage testing transformer 20 have the same ratings as in the FIG. 2 embodiment. The primary winding 30a of the second transformer 30 must have the same rating as the variable reactor 22 in the FIG. 2 embodiment, namely 200 KVA, 200 KV and 1 A in order to match the capacitive load 14. The secondary winding 30b of transformer 30 is rated at 200 KVA, 240 V and 833 A. Assuming fixed reactor 32 has a rating of 480 volts, the induction voltage regulator 31 has the same high rating as regulator 13 in the FIG. 1 embodiment. Thus, the FIG. 3 embodiment has the advantage over the FIG. 2 embodiment of requiring a reactor 32 which is of much lower voltage rating and therefore simpler and less expensive to fabricate and does not have complexity of being variable. However, the FIG. 3 embodiment has the disadvantage of requiring a second transformer 30 which is large and expensive due to its high KVA and voltage rating. The FIG. 3 embodiment is more expensive than the FIG. 2 embodiment even though it overcomes the disadvantage of using a variable high voltage reactor since it requires an additional transformer and induction voltage regulator.

Figure 4:
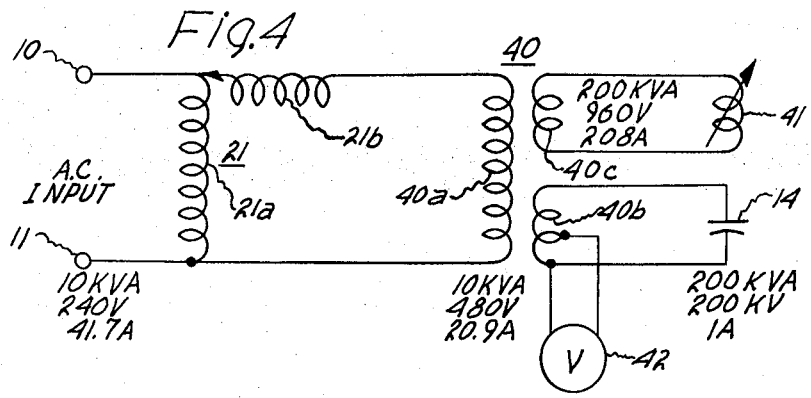
FIG. 4 is a schematic diagram of a first embodiment of a high voltage, resonant testing circuit in accordance with my invention utilizing a variable reactor.

FIG. 4 illustrates a first embodiment of a resonant high voltage testing circuit in accordance with my invention, and in particular, includes a high voltage testing transformer 40 having a primary winding 40a and two secondary windings 40b and 40c. The capacitive load 14 is connected across secondary winding 40b and a variable reactor 41 is connected across secondary winding 40c. Capacitor 14 and reactor 41 are therefore in effective series circuit relationship through transformer 40. The A.C. power requirements at input terminals 10 and 11 and induction voltage regulator 21 and primary winding 40a of transformer 40 have the same ratings as the corresponding elements in the FIGS. 2 and 3 embodiments. The transformer secondary winding 40b, of course, has the same rating as the capacitive load 14. In order to obtain a resonant condition whereby only resistive losses are present, the reactive power rating of variable reactor 41 and the transformer secondary winding 40c are also at 200 KVA. Variable reactor 41 has a voltage and current rating of 960 volts and 208 amperes, respectively, and a low inductance of 0.0122 henries. The advantages of my FIG. 4 embodiment are that the single transformer 40 combines the functions of the two transformers in the FIG. 3 embodiment, only one high voltage winding 40b is required and the transformer secondary winding 40c may be readily designed for an optimum voltage appropriate for the variable reactor 41. Also, the variable reactor 41, as opposed to variable reactor 22 in FIG. 2, is a relatively low voltage device and therefore far simpler in construction and less costly as compared to the high voltage variable reactor 22, and low voltage device 41 is more easily made variable and with much greater precision than the high voltage device 22. For the specific parameters recited herein, the voltage rating of reactor 41 is in the order of 1/200 of the predetermined high voltage (200 KV) developed across capacitive load 14 at the condition of resonance. A voltmeter 42 is connected across a portion of the secondary winding 40b as one conventional example of a means for determining a condition of resonance in the testing circuit.

The third transformer winding 40c is thus utilized for increasing the phase angle between the transformer primary and secondary winding currents to its maximum for the purpose of reducing the reactive power required from the primary winding and the A.C. source during testing of a particular load such as a high voltage transmission cable.

The method of resonant testing in accordance with my invention is as follows. The first and second ends of transformer secondary winding 40b are respectively connected to the conducting sheath and conductor of the transmission cable undergoing test. In the case of a plurality of conductors, successive tests would test the dielectric between the conducting sheath and the various other conductors as well as between each pair of conductors. Voltage regulator 21 is initially at its zero output setting. Regulator 21 is then adjusted to increase the voltage applied to the primary winding to a low value, in the order of 1/10 rated voltage. Variable reactor 41 is then adjusted for obtaining resonance with capacitive load 14, the resonance being indicated by a peak reading on voltmeter 42. Upon achieving resonance, regulator 21 is adjusted to obtain the required voltage across the capacitive load for testing purposes. A further slight adjustment of variable reactor 41 may be required at this point, by again seeking a peak on voltmeter 42 since the increased voltage applied across the primary winding may have slightly detuned the circuit. The rated voltage is then maintained for a prescribed time interval across the selected elements of the high voltage transmission cable and, in the absence of any defect in the cable, the test value of current, one amphere in the particular conditions described hereinabove, remains constant. If the cable under test has a failure, the current at the fault will increase to approximately 20 times the test value for the assumed $Q = 20$ and this increase in current has the advantage of burning the fault to the point that it can be visible and easily located. In the case of the FIG. 2 embodiment, the fault current would be reduced to 1/20 of the test value and therefore the fault not easily located. The fault current would be reduced to such low value in the FIG. 2 embodiment since in the presence of a fault the load 14 effectively is no longer a capacitance and the impedance in the secondary winding circuit of the transformer has now increased to the reactance presented by reactor 22 whereas at resonance such inductive reactance would substantially equal the capacitive reactance of load 14.

Figure 5:
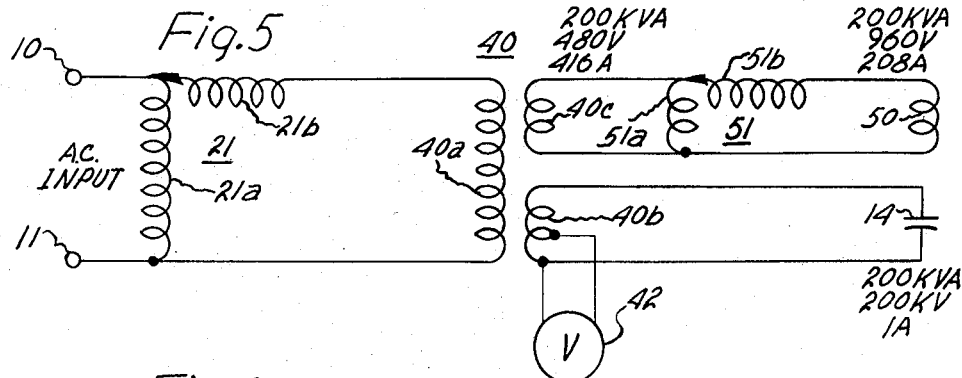
FIG. 5 is a schematic diagram of a second embodiment of my high voltage, resonant testing circuit utilizing a fixed reactor and an induction voltage regulator to vary the reactance.

A second embodiment of my resonant testing circuit is illustrated in FIG. 5 wherein the variable reactor 41 of FIG. 4 is replaced structurally and functionally by a fixed reactor 50 and an induction voltage regulator 51 connected in circuit relationship with the low voltage secondary winding 40c of transformer 40. The FIG. 5 embidiment has the advantage that the reactor 50 is much simplified since the requirement of being variable is eliminated. The combination of regulator 51 and reactor 50 provides an effective fixed inductance which is required to attain resonance with capacitor 14. The induction voltage regulator 51 is used to vary the voltage impressed across reactor 50 and thereby vary the inductance as reflected into the transformer 40. The range over which the inductance of reactor 50 is varied is directly proportional to the voltage range of regulator 51, and is assumed to be ±480 V for the given parameters. The fixed reactor 50 also has a voltage rating in the order of 1/200 of the voltage developed across capacitive load 14 at resonance for the parameters recited herein.

Figure 6:
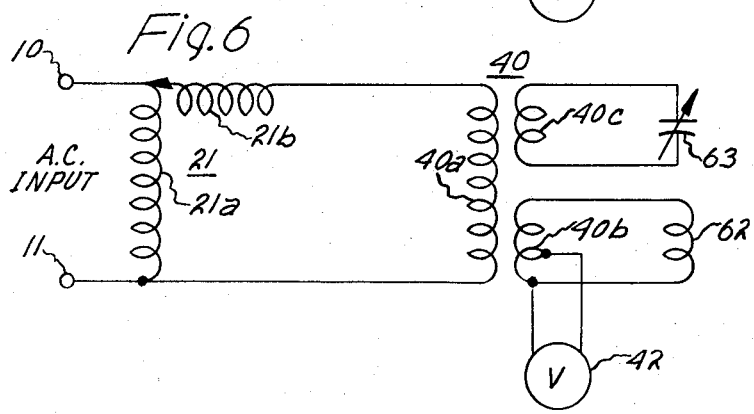
FIG. 6 is a third embodiment of my high voltage, resonant testing circuit wherein the load being tested is substantially only inductive.

A third embodiment of my invention is illustrated in FIG. 6 wherein the load undergoing high voltage testing is a substantially pure inductance load 62 and a variable capacitor 63 is connected across the low voltage third transformer winding 40c and adjusted in order to obtain resonance with the inductive reactance of load 62. This latter test circuit may not have as many applications as the FIGS. 4 and 5 embodiments but there may be cases wherein it is desired to impress a high voltage across the ends of a magnet coil or the coil of other type electrical machines for testing the breakdown thereof. In all other respects the FIG. 6 embodiment is the same as the FIG. 4 embodiment.

From the foregoing description, it can be appreciated that my invention makes available an improved circuit for resonant high voltage testing and utilizes only one transformer having two secondary windings, only one of which is a high voltage winding. The low voltage secondary winding is suitably connected to a variable reactor means which may consist of a variable reactor or the combination of a fixed reactor and induction voltage regulator, such reactor being utilized for resonating with a high voltage capacitive load being tested. The use of a low voltage reactor in a secondary winding circuit of the testing transformer results in the use of a reactor of simplified structure and low cost as compared to the high voltage reactor utilized in the FIG. 2 embodiment and the use of a second transformer in the FIG. 3 embodiment. The voltage rating of the reactor is generally less than 1/100 of the load test voltage.

Having described three embodiments of my invention, it is believed obvious that modification and variation of my invention is possible in the light of the above teachings. Thus, other conventional voltage adjusting apparatus may be utilized in the primary circuit in place of the induction voltage regulator, an auto transformer being one such example. Such alternative apparatus may also be utilized in place of the regulator 51 utilized in the FIG. 5 embodiment. It is, therefore, to be understood that changes may be made in the particular embodiments described which are within the full intended scope of my invention as defined by the following claims.

What I claim as new and desire to secure by Letters Patent of the United States is:

1. A high voltage resonant testing circuit for testing the dielectric strength of electric insulation of a reactive load and having the KVA power supplied from the power source being substantially less than the KVA power requirements of the load to be tested, and comprising a single transformer having a low voltage primary winding, a low voltage secondary winding and a very high voltage secondary winding across which is connected a reactive load to be tested for the dielectric strength of its electric insulation, means connected to said low voltage primary winding for supplying an adjustable voltage alternating current power thereto, and means connected in circuit relationship with said low voltage secondary winding for providing a variable reactance of a type opposite to that of the reactive load and adapted to be tuned to resonance with the reactive load and thereby increasing the phase angle between the transformer primary and secondary currents to a maximum so as to substantially reduce the KVA power required from said primary winding during testing of the dielectric strength of the electric insulation of the reactive load, said variable reactance means being low voltage rated as compared to a predetermined very high voltage in the order of 200 kilovolts developed across the reactive load at the condition of resonance during testing of the reactive load, said low voltage rated variable reactance means providing greater ease in obtaining precise variation in voltage as compared to a high voltage rated variable reactance means.

2. The circuit set forth in claim 1 wherein
the reactive load is a capacitive reactance load, and
said low voltage rated variable reactance means is a variable inductive reactance means.

3. The circuit set forth in claim 2 wherein
said adjustable voltage alternating power supplying means consists of
a source of alternating current voltage of fixed frequency and amplitude, and
means connected in circuit relationship between said source and said primary winding for adjusting the alternating current voltage applied thereto, the voltage being increased from zero and maintained at a very low value prior to achieving resonance, and being increased to a low value necessary to develop the predetermined very high voltage across the capacitive load after achieving resonance.

4. The circuit set forth in claim 3 wherein
said primary winding voltage adjusting means is a voltage regulator, and
the KVA power rating of said voltage regulator and said transformer primary winding is in the order of 1/20 of the KVA power requirement of the load.

5. The circuit set forth in claim 3 wherein
said primary winding voltage adjusting means is an induction voltage regulator.

6. The circuit set forth in claim 3 wherein
said low voltage rated variable reactance means is a variable inductive reactor having a voltage rating substantially equal to the low voltage rating of said low voltage secondary winding, and connected in series circuit relationship therewith.

7. The circuit set forth in claim 3 wherein said low voltage rated variable reactance means consists of a fixed inductive reactor, and means connected in circuit relationship between said low voltage secondary winding and said fixed inductive reactor for adjusting the alternating current voltage applied thereto and thereby varying the inductance in said low voltage secondary winding for achieving resonance with the capacitive load.

8. The circuit set forth in claim 6 wherein the voltage rating of said variable inductive reactor is in the order of 1/200 of the predetermined very high voltage developed across the capacitive load at the condition of resonance whereby said reactor is a relatively simple, inexpensive apparatus.

9. The circuit set forth in claim 7 wherein the voltage rating of said fixed inductive reactor is in the order of 1/200 of the predetermined very high voltage developed across the capacitive load at the condition of resonance whereby said reactor is a relatively simple, inexpensive apparatus.

10. The circuit set forth in claim 1 wherein the reactive load is an inductive reactance load, and said low voltage rated variable reactance means is a variable capacitive reactance means.

* * * * *